United States Patent [19]

Nagy

[11] Patent Number: 5,504,303
[45] Date of Patent: Apr. 2, 1996

[54] LASER FINISHING AND MEASUREMENT OF DIAMOND SURFACE ROUGHNESS

[75] Inventor: Bela G. Nagy, Acton, Mass.

[73] Assignee: Saint-Gobain/Norton Industrial Ceramics Corp., Worcester, Mass.

[21] Appl. No.: 353,753

[22] Filed: Dec. 12, 1994

[51] Int. Cl.⁶ .......................... B23K 26/00; G01B 11/30
[52] U.S. Cl. ............................ 219/121.68; 219/121.69; 219/121.82
[58] Field of Search ..................... 219/121.76, 121.77, 219/121.83, 121.8, 121.82, 121.68, 121.69, 121.61, 121.62; 356/69, 357, 371; 216/65

[56] References Cited

U.S. PATENT DOCUMENTS

| | | | |
|---|---|---|---|
| 4,364,663 | 12/1982 | Gardner et al. | 356/371 |
| 4,401,876 | 8/1983 | Cooper | 219/121.69 |
| 4,473,735 | 9/1984 | Steffen | 219/121.69 |
| 4,973,164 | 11/1990 | Weber et al. | 356/371 |
| 5,243,405 | 9/1993 | Tichenor et al. | 356/371 |
| 5,293,216 | 3/1994 | Moslehi | 356/371 |
| 5,349,440 | 9/1994 | DeGroot | 356/357 |

FOREIGN PATENT DOCUMENTS

| | | | |
|---|---|---|---|
| 57-100889 | 6/1982 | Japan | 219/121.76 |
| 58-221687 | 12/1983 | Japan | 219/121.62 |
| 4-172192 | 6/1992 | Japan | 219/121.83 |

*Primary Examiner*—Geoffrey S. Evans
*Attorney, Agent, or Firm*—Volker R. Ulbrich; David P. Gordon

[57] ABSTRACT

A combination measuring and ablation laser apparatus is provided which generally includes an ablating laser, a profilometer laser, an automatic feedback control unit and electro-mechanical positioning apparatus. The combination measuring and ablation laser apparatus can have a single multi-mode laser having an ablating mode and a measuring mode and a positioning means for positioning the laser between ablating and measuring modes. In operation, the profilometer laser measures the thickness of a diamond sample and compares it to the desired thickness. Where the measured thickness is too large, the feedback control unit activates the ablating laser for a predetermined time interval to smoothen any irregularities which may be contributing to the diamond sample thickness. At the end of the time interval, the portion is remeasured by the profilometer laser to determine if it conforms to the desired thickness. If the portion still fails to conform to the desired thickness, the feedback control unit repeats the steps of positioning and activating the ablation laser to further ablate the portion. This process is repeated until the thickness of the portion is equal or less than the desired thickness, after which the same procedure is used on the rest of the diamond sample until a uniform desired thickness is achieved throughout.

18 Claims, 5 Drawing Sheets

LASER FINISHING AND MEASUREMENT OF DIAMOND SURFACE ROUGHNESS

BACKGROUND OF THE INVENTION

1. Field of the Invention

This invention relates broadly to apparatus and methods for the precision measuring and finishing of surfaces. More particularly, this invention relates to precision measuring and finishing of diamond surfaces using lasers.

2. State of the Art

Diamond has exceptional hardness, thermal conductivity, electrical insulation and light transmission properties, and is therefore useful in various applications such as cutting tools, heat sinks, insulators, electronic substrate materials, etc. In particular, while the use of diamond in cutting tools has been long known, it has only recently become increasingly common. Diamond cutting tools usually appear in one of three general forms: sintered cutting tools, single diamond cutting tools, and chemical vapor deposition (CVD) diamond coated cutting tools. Specific examples of diamond cutting tools include flat cutting tools for lathes, and round cutting tools such as routers, drills, and milling bits. The above-mentioned tools, however, suffer from various drawbacks. Sintered cutting tools in general have poor durability, as they contain a bonding material having inferior wear resistance and thermal conductivity relative to diamond. Single diamond cutting tools require the use of a large stone which, whether natural or artificial, can be very costly. CVD diamond cutting tools often experience separation of the diamond from the tool during cutting operations, as the adherence between the metallic substrate and the diamond coating is generally poor.

Known methods of improving the adhesion between a diamond film and a cutting tool involve cutting a diamond film produced by a vapor phase synthesis process to the desired shape and affixing it to the cutting tool, or interposing a bonding layer between the substrate and the surface diamond. Diamond film formed by vapor phase synthesis, however, tends to have large surface irregularities, and a process for smoothing or polishing (known as ablating) the surface of the diamond film is required to obtain the proper thickness tolerance and surface finish. Due to the extreme hardness of diamond, specialized tools are required for accurately measuring and machining the surface of the diamond film to the desired finish. Typical methods for mechanical diamond finishing involve abrading the diamond film with a diamond grit slurry on a lapping machine. These methods tend to be costly and time consuming, however, often entailing ablating speeds of about 0.1 μm/min to 0.1 μm/hr and requiring up to several weeks to finish a four inch diameter diamond wafer.

In order to overcome the aforementioned shortcomings of conventional diamond film ablating methods, it is known in the art to use a laser or other high energy beam to ablate the surface of a diamond film in order to achieve a desired finish. The use of lasers and similar high energy beams is usually less time-consuming and more accurate, as well as more cost efficient than conventional mechanical processes. In general, laser ablation is accomplished by irradiating the surface of the diamond with a laser beam at an angle, such that the convex irregularities on the surface are exposed to a higher laser power density than the planar areas, and the concave irregularities are shielded by the convex ones. The laser undergoes several passes over the surface of the diamond to evenly smoothen the surface. The result is that a maximum convexity height (Rmax) of 50 μm on the surface of a diamond can be reduced to 3 μm within a short period of time.

A problem with known laser ablation techniques, however, is that it is difficult to obtain any particular level of surface smoothness unless the surface of the diamond film is ablated in very small increments and separately measured after each ablatement. This process is time consuming, especially in light of the fact that the diamond film must be moved and recalibrated each time it is measured or ablated.

The preferred instrument for measuring the thickness and surface finish of a thin material is one which reflects a laser beam off the surface of the material to be measured. Such an instrument is known as a "laser profilometer" and measures the surface profile of the material. The measured profile can then be related to a substrate baseline to obtain a thickness measurement for the material.

Although the use of lasers to measure and ablate diamonds has greatly improved the finishing of diamond surfaces, existing methods and apparatuses using laser technology are still too slow and inefficient to meet the increasing demands of today's industry.

SUMMARY OF THE INVENTION

It is therefore an object of the invention to provide a laser apparatus which both measures the smoothness of and polishes a diamond surface.

It is another object of the invention to provide a laser apparatus which is a measurement feedback-controlled ablating system that can be readily programmed.

It is also an object of the invention to provide a laser apparatus for measuring and ablating a diamond surface where the measurement is done in real time as the ablating is carried out.

It is also an object of the invention to provide a method for measuring and ablating a diamond surface with a single laser apparatus.

In accordance with the objects of the invention, which will be discussed in detail below, a combination measuring and ablation laser apparatus is provided with feedback-control which can be readily programmed to provide a diamond sample with a desired diamond surface geometry via repeated laser ablation and laser scanning without removal of the diamond from the apparatus. The same laser beam may be used for ablating and measuring, or separate beams may be provided by the same apparatus. Different methods of operating the measuring and ablation laser apparatus are also discussed below.

In a first embodiment of the invention, the laser apparatus generally includes an ablating laser, a profilometer laser, an automatic feedback control unit and electro-mechanical positioning mechanism. The profilometer laser measures the thickness of a portion of diamond. The measurement taken by the profilometer laser is then compared to a recorded value representing the desired thickness. Where the measurement is found to be greater than the desired thickness, the feedback control unit causes the positioning mechanism to position the ablation laser to ablate the measured portion of the diamond for a predetermined time interval which depends upon the measured thickness of the portion. The ablation laser uses a low angle ablation technique to smooth any irregularities which may be contributing to the thickness of the thickness of the diamond. After ablating, the polished portion of the diamond is remeasured by the profilometer laser to determine if it conforms to the desired thickness. If the thickness of the portion is still greater than the desired thickness, the feedback control unit repeats the steps of positioning and activating the ablation laser to further ablate the polished portion. This process is repeated until the thickness of the portion is substantially equal to the desired thickness. Once the desired thickness is obtained, the feedback control unit causes the positioning mechanism to reposition the profilometer laser to another portion of the diamond sample and the above steps of measuring and ablating are repeated until the portion has the desired thickness. Once every portion of the diamond has undergone this procedure, the diamond will have the uniform desired thickness; i.e. smoothness.

Several alternative embodiments of a combination measuring and ablation laser apparatus according to the invention are also provided. In a first such alternative embodiment, a single laser is provided with two different modes which are controlled by a feedback control unit. In a first mode, the laser acts as a profilometer laser by using a low energy beam at a right angle to the diamond surface for measuring the thickness of a portion of the diamond. In a second mode, the laser acts as a diamond ablating apparatus by emitting a higher energy beam at a low angle relative to the surface of the diamond for ablating the diamond surface. The feedback control unit in the laser apparatus causes the positioning mechanism to reposition the laser along set positions of a track, and switches the laser between measuring and ablating mode as required according to methods described below.

A second alternative embodiment of the combination measuring and ablation laser apparatus also utilizing a single multi-mode laser. Unlike the other embodiments, however, the laser is stationary and the diamond is affixed to a positionable sample holder. The sample holder includes a sliding track, an axis rail adjustably positioned relative to the track, and a semi-circular sleeve rotatable about the axis rail. In this embodiment the laser is stationary and the diamond is positioned relative to the laser via the above described adjustable sample holder in order to cause the laser to assume a right angle or low angle position relative to the sample.

Different methods utilizing the laser apparatuses of the invention are also provided. According to a first method utilizing the dual laser apparatus, measurement and ablation of the diamond surface are carried out substantially concurrently. With the single laser embodiments of the invention, measurement and ablation are conducted alternatively as either the laser or the diamond is repositioned.

According to another method of the invention, the thickness of the entire diamond sample is first measured portion by portion and the measurements are stored in a memory. Then, each portion which does not conform to the desired thickness is ablated. Depending on the degree of variation between a measured portion and the desired thickness, the feedback control unit programs the power level and duration of the ablation beam for that portion. Once the entire diamond surface has undergone this first round of ablation, every portion is remeasured and the above described process is repeated until the desired smoothness is obtained throughout the diamond.

Additional objects and advantages of the invention will become apparent to those skilled in the art upon reference to the detailed description taken in conjunction with the provided figures.

BRIEF DESCRIPTION OF THE DRAWINGS

FIG. 5b is a perspective view of a portion of the second embodiment of a single laser apparatus shown in FIG. 5a;

DETAILED DESCRIPTION OF THE PREFERRED EMBODIMENT

Figure 1:
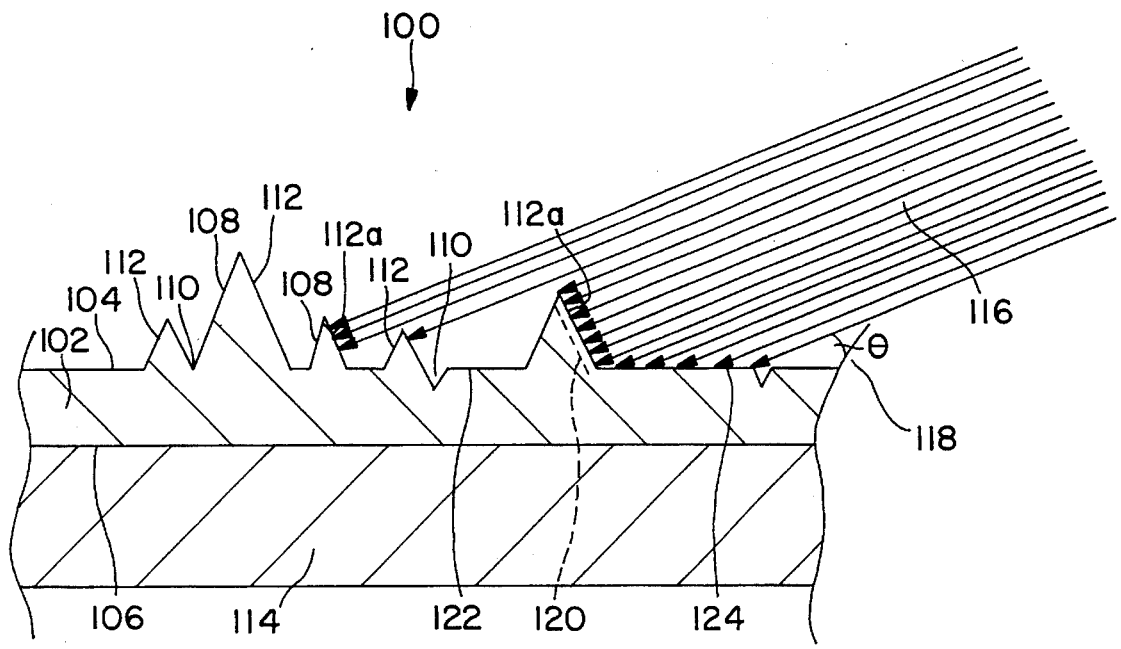
FIG. 1 is a magnified cross-sectional view of a diamond surface being ablated by a laser beam according to the prior art.

Turning now to prior art FIG. 1, a diamond sample 102 is seen to have an upper surface 104, and a lower surface 106 which is bonded to a substrate 114. The substrate 114 is typically comprised of ceramic or metallic composition. The upper surface 104 of the diamond contains convex and concave irregularities 108, 110 and substantially smooth portions 111. The convex irregularities 108 further include a plurality of angled surfaces 112. As seen in FIG. 1, in order to smooth the upper surface 104 of the diamond 102, a laser beam 116 is used to irradiate the upper surface 104 of the diamond sample 102 at a predetermined angle of incidence. In this manner, the highest power density of the laser beam 116 is concentrated for the most part on the exposed angled surfaces 112a of the convex irregularities 108. These exposed surfaces 112a are ablated by the beam 116 over time, thus reducing the overall size of the convex irregularities 108 on the surface 104 of the diamond 102 (as indicated at 120). The concave irregularities 110 and substantially smooth portions 111 are either shielded (at 122, e.g.) from the beam 116 by the convex irregularities 108 or exposed to only low laser power densities (at 124, e.g.) which are incapable of significantly ablating the diamond sample 102. In order to achieve the highest possible degree of uniformity and smoothness for the surface 104 of the diamond sample 102, the angle of incidence θ can be changed and the laser beam 116 aimed at other convex irregularities 108 and their angled surfaces 112 for ablatement. The laser ablatement procedure is then repeated several times with the above mentioned variations until the desired diamond surface finish is achieved.

Figure 2:
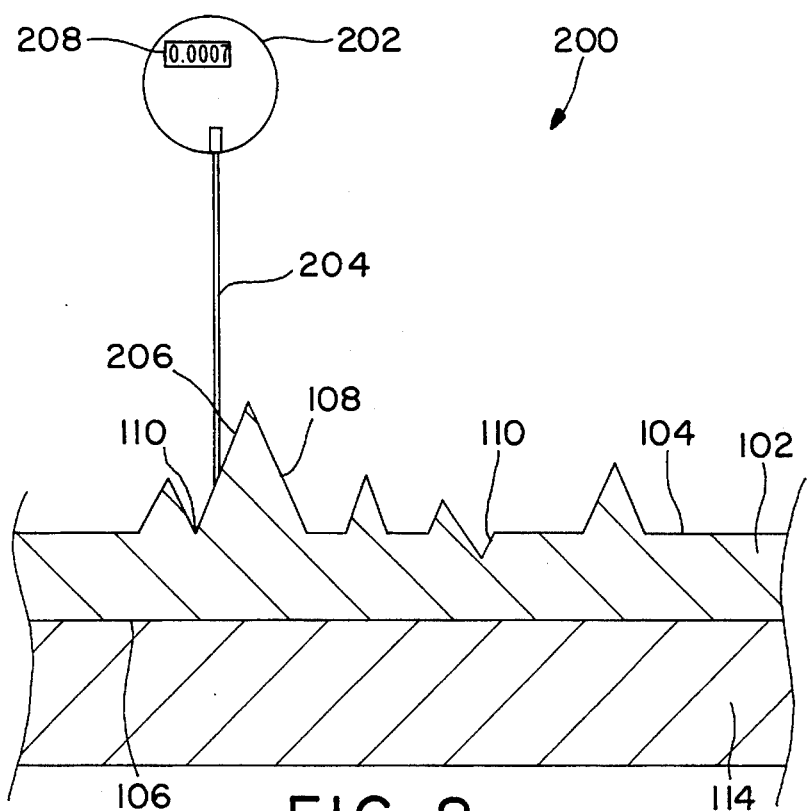
FIG. 2 is a magnified view of a diamond surface being measured by a profilometer laser measuring beam according to the prior art.

Referring now to FIG. 2, a prior art laser measuring apparatus 202, also known as a profilometer laser, is aimed at the surface 104 of the diamond 102 such that a laser beam 204 emanating from the profilometer laser 202 is substantially perpendicular to the diamond surface 104. The laser beam 204 is of a predetermined width and power density so as not to ablate any of the diamond 102. The profilometer laser 202 determines the thickness of the diamond 102 at a particular portion 206 by aiming the laser beam 204 at the portion 206 and measuring the time elapsed from when the laser beam 204 leaves the profilometer laser 202, reflects off the surface at portion 206 and returns to the profilometer laser 202. From this elapsed time, the distance travelled by the laser beam 204 is determined. This distance is then compared to a stored value representing a diamond thickness of zero (this value is simply calculated in terms of the distance a laser beam must travel to get from the stationary laser 202 to the lower surface 106 of the diamond 102.) The actual thickness of the diamond 102 at portion 206 is then calculated from these values and the thickness or the delta from a desired thickness can be displayed on an LCD readout 208. By measuring various portion thicknesses, the relative smoothness of the surface of the diamond can thus be determined. If the surface of the diamond is not smooth enough, the diamond 102 can be moved from the measuring apparatus 202 and placed under an ablating apparatus as described in FIG. 1 for ablating. Once polished, the sample may be moved again to the laser profilometer for measuring. This back and forth process between ablating laser and profilometer laser can be repeated until the desired surface smoothness of the diamond 102 is achieved.

Figure 3:
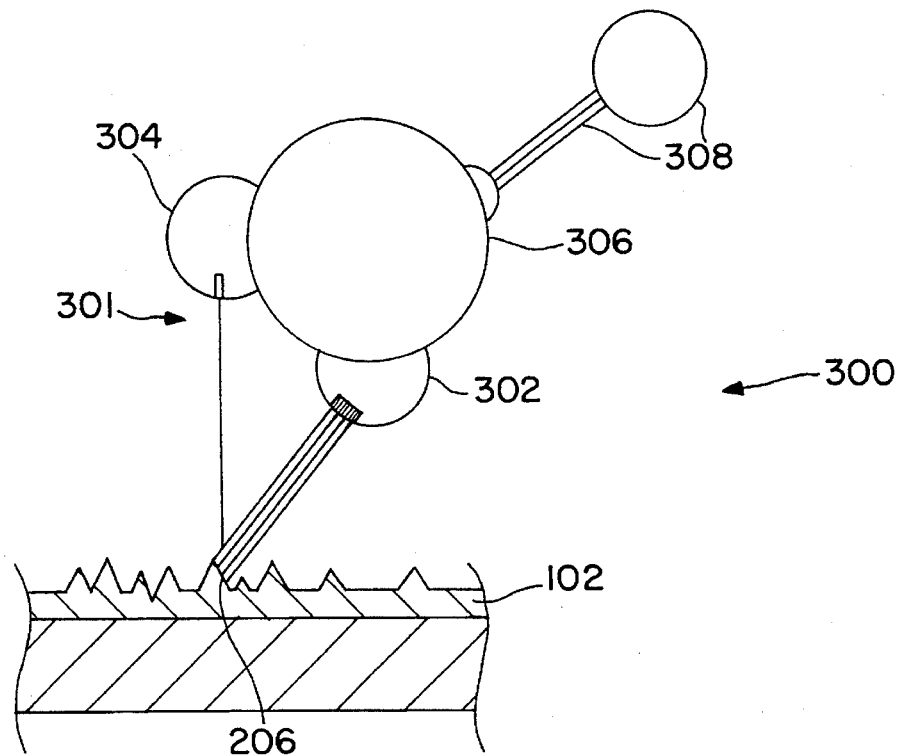
FIG. 3 is a side elevation view in partial section of a diamond surface being measured and ablated by a dual laser apparatus according to the invention.

Turning now to FIG. 3, a detailed view of a first embodiment of the diamond surface laser finishing apparatus 300 according to the invention is shown. The apparatus 300 includes an ablating laser 302, a profilometer laser 304, a programmable automatic feedback control unit 306 and electro-mechanical positioning apparatus 308. The profilometer laser 304, which is preferably a solid state diode laser having a wavelength of about 700 nm, measures the thickness of a portion 206 of a diamond 102 in a fashion similar to that described in FIG. 2. The measured value is recorded in the automatic feedback control unit 306 and compared to a pre-recorded thickness value representing the desired thickness. If, upon comparison, the measured value is determined to be greater than the pre-recorded value, the feedback control unit 306 electronically activates the ablating laser 302, which is typically a YAG or excimer ablating laser, for a specific time interval. The time interval may be programmed to be of a predetermined set duration, or to vary based on the difference between the measured thickness of portion 206 and the pre-recorded desired thickness. In either case, the duration of the time interval is selected so as to minimize the risk of excessively ablating the measured portion 206 to a thickness less than that of the desired thickness. At the end of the timed ablatement procedure, the portion 206 is remeasured by the profilometer laser 304, which again records the value in the automatic feedback control unit 306 for comparison to the pre-recorded thickness value. If the value obtained is still greater than the pre-recorded thickness value, the feedback control unit 306 reactivates the ablating laser 302. This process is repeated until the thickness of the portion 206 is substantially equal to the pre-recorded thickness value. Due to the extremely small dimensions of the diamonds involved and the speed and efficiency of the laser apparatus 300, the measurement and ablation of the diamond surface may be carried out substantially concurrently in this embodiment. Once the desired portion thickness is obtained, the feedback control unit 306 signals the positioning apparatus 308 to reposition the profilometer laser 304 to another unfinished portion (not shown) of the diamond 102. The measuring and ablating steps used in finishing the first portion are then repeated for this new portion. The finishing process is then repeated for every unfinished portion until a substantially uniform thickness is achieved for the entire diamond 102. The size of each portion and the number of portions per diamond may be programmed into the apparatus 300 depending on the degree of precision sought and the lasers used.

As suggested above, different types of ablating lasers can be used. However, a frequency doubled YAG or an excimer laser having a wavelength range of 190–250 nm and frequency range of 150–500 Hz, with a varying scan rate depending on the material to be ablated, and a pulse energy in the range of 50–80 millijoules is preferred. A laser with the above specifications typically removes from 10 to 40 microns of diamond per laser pass. It is preferable that the ablating laser frequency be no greater than that suggested, as higher frequencies may result in excessive local heat buildup, which can result in a possible thermal fracturing of the diamond.

Figure 4:
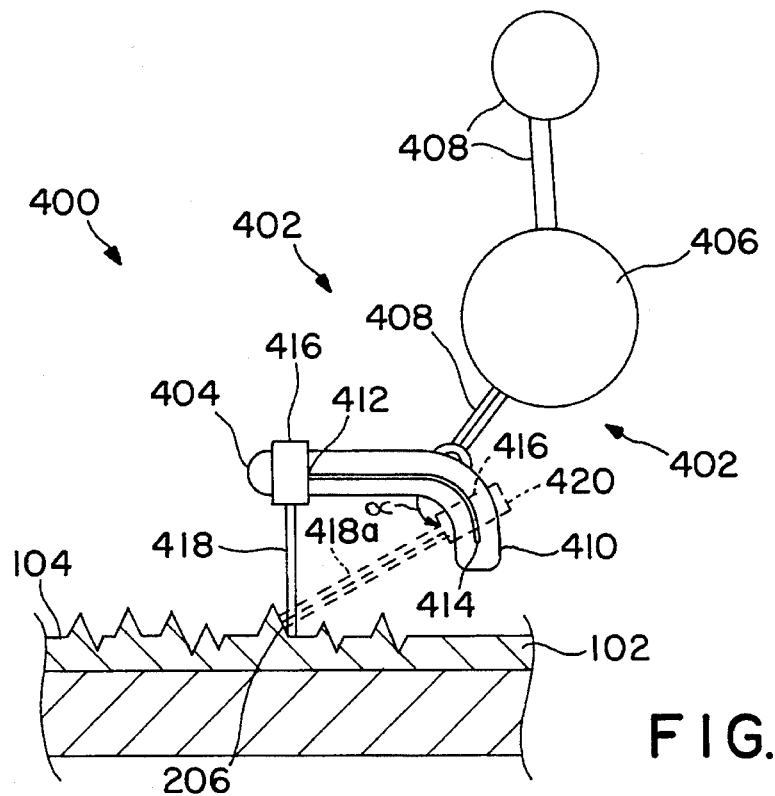
FIG. 4 is a side elevation view in partial section of a diamond surface being alternatively measured and ablated by a first embodiment of a single laser apparatus according to the invention.

Referring now to FIG. 4 a detailed view of a second embodiment of the diamond surface laser finishing apparatus 402 according to the invention is shown. The apparatus 402 includes a single laser 404 which is positionable to both measure and ablate, a sliding track 410 with two set positions 412, 414, a programmable automatic feedback control unit 406 and electro-mechanical positioning means 408. The combination laser 404 includes two different modes which are controlled by the feedback control unit 406. In a first mode, the laser 404 acts as a profilometer laser by using a low energy beam 418 at a right angle to the diamond 102 in order to measure the thickness of portion 206 of the diamond 102. In a second mode, the laser 404 acts as a diamond ablating apparatus by emitting a higher energy beam 418a at a predetermined angle $\theta$ relative to the diamond surface 104 in order to ablate the diamond surface 104 at portion 206. As shown in FIG. 4, when in the profilometer laser mode 416, the laser 404 is positioned on the track 410 at a first set position 412 so that the emitted measuring laser beam 418 is perpendicular to the diamond upper surface 104. As in the first embodiment of the invention, the laser 404 measures the thickness of the portion 206 of the diamond 102 and the automatic feedback control unit 406 compares the obtained value to a pre-recorded desired thickness value. If the measured value is determined to be greater than the pre-recorded value, the feedback control unit 406 causes the positioning means 408 to electronically reposition the laser 404 via the track 410 to the second set position 414. The laser 404 is angled relative to the surface 104 of the diamond 102 such that it can accurately ablate the measured portion 206. The feedback control unit 406 then switches the laser 404 from the measuring mode 416 to the ablating (ablation) mode 420 and activates the laser for a desired time interval. At the end of the timed ablatement procedure, the automatic feedback control unit 406 switches the laser 404 back to its measuring mode 416 and returns it to its initial measuring position 412. The diamond portion 206 is remeasured by the laser 404 in the profilometer mode 416 to determine whether it will need additional ablation. Where additional ablation is needed, the feedback control unit 406 repeats the above outlined steps of repositioning the laser and switching it to the ablating mode 420 before activating it. This process is repeated until the thickness of the portion 206 is substantially equal to the pre-recorded desired thickness value. Once the desired thickness has been obtained, the feedback control unit 406 signals the positioning apparatus 408 to move the laser 404 and track 410 to another unfinished portion (not shown) of the diamond 102. The measuring and ablating steps used in finishing the first portion 206 are then repeated for this portion until the desired thickness is obtained. The portion finishing process is in turn repeated for every unfinished portion of the diamond until a uniform thickness is achieved throughout the diamond 102.

Figure 5A:
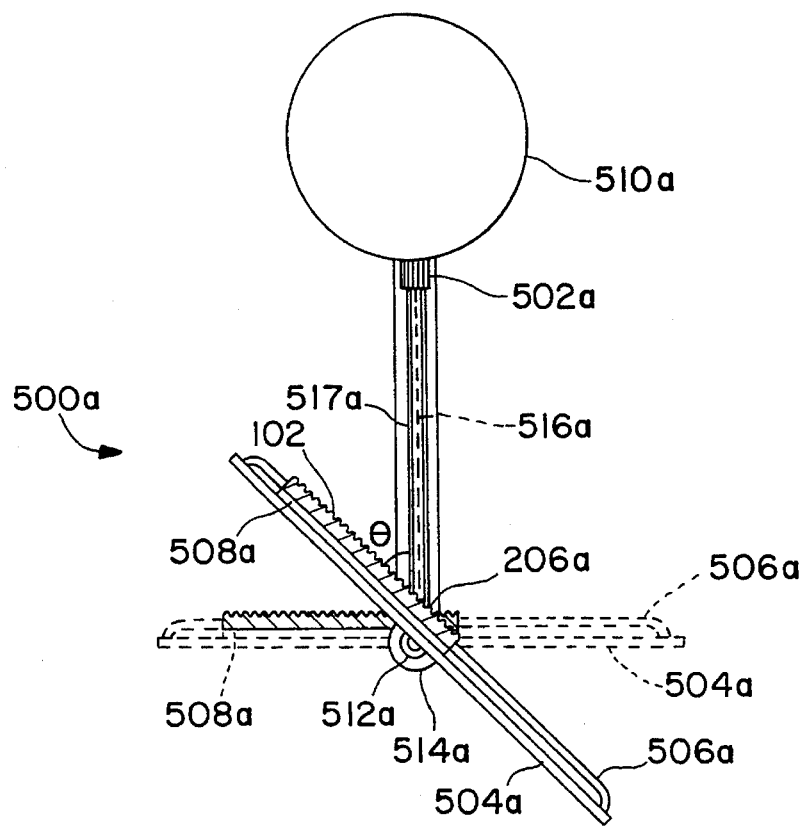
FIG. 5a is a side elevation view in partial section of a diamond surface being alternatively measured and ablated by a second embodiment of a single laser apparatus according to the invention.
Figure 5B:
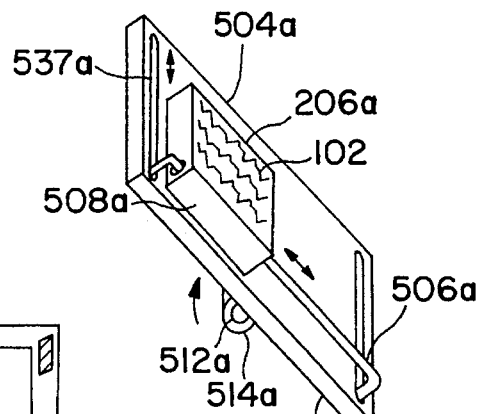

Turning now to FIGS. 5a and 5b, a detailed view of a third embodiment of the diamond surface laser finishing apparatus 500a according to the invention is shown. The apparatus 500a includes a combination profilometer laser and ablation laser 502a, an axially rotatable table 504a, first and second tracks 506a, 537a on the table 504a, a sample holder 508a translatably mounted on first and second tracks 506a, 537a, and an automatic feedback control system 510a. The table 504a has an axis rail 512a perpendicular to the laser beam axis 517a, and a semi-cylindrical sleeve 514a rotatably positionable about the axis rail 512a. As in the second embodiment, the combination laser 502a includes two different modes which are activated and deactivated by the feedback control unit 510a. In this embodiment, however, the laser 502a is stationary and the diamond 102 is adjustably located. In particular, the table 504a is perpendicular to the laser beam 516a while the laser apparatus 500a is in measurement mode, and is rotated about the axis rail 512a to an angle θ (without translational movement) when the laser apparatus 500a is in ablating mode. Thus measurement and ablation occur without axial movement of the sample. To reposition the diamond 102 relative to the laser beam 516a, the sample holder 508a is translated along the first and second tracks 506a, 537a on the table 504a. During operation, the laser finishing apparatus 500a follows essentially the same measuring and ablating process described for the second embodiment. The laser 502a begins in profilometer laser mode by emitting a measuring laser beam 516a which is perpendicular to the diamond 102. A portion 206 is measured and if the thickness of the portion 206 is determined by the feedback control unit 510 to be greater than the desired value, the laser 502a is electronically switched from measuring mode to ablating mode. The position of the diamond 102 is then adjusted by rotating the table 504 about the axis rail 512 such that an ablating beam 518 emanating from the laser 502 is incident on the measured portion 206 at an appropriate ablation angle θ. The laser 502a is activated for a specific time interval in ablation mode before being switched back to measurement mode to remeasure the portion 206. These steps are repeated until the appropriate thickness of the portion 206 is achieved. As with the previously discussed embodiments, the remaining portions of the diamond 102 undergo the same measurement and ablation process until the desired surface smoothness is achieved throughout the diamond.

Figure 5C:
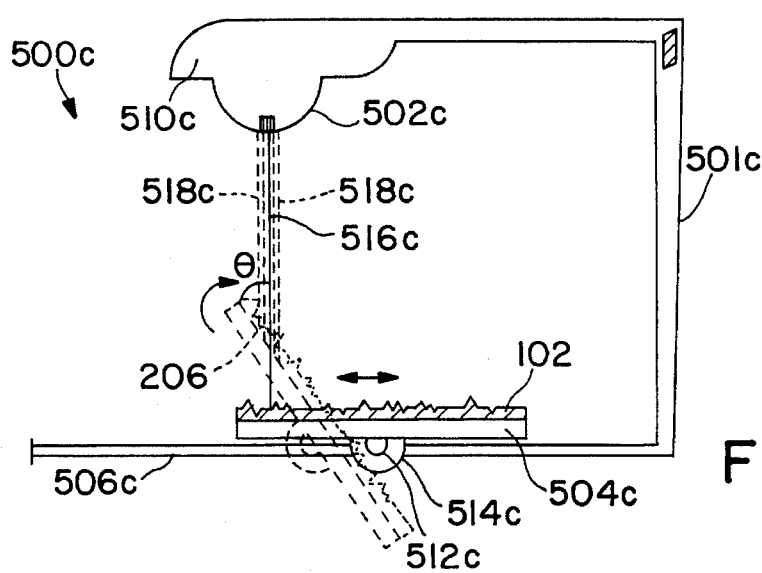
FIG. 5c is a side elevation view in partial section of a diamond surface being alternatively measured and ablated by a third embodiment of a single laser apparatus according to the invention.

Turning now to FIG. 5c, a detailed view of a fourth embodiment of the diamond surface laser finishing apparatus 501c of the invention is shown. The apparatus 501c is substantially similar to the third embodiment and includes a combination profilometer laser and ablation laser 502c, a rotatable and translatable sample holder 504c, a sliding track 506c for linearly translating the sample holder 504c, and an automatic feedback control system 510c. The sample holder 504c is coupled to a semi-cylindrical sleeve 514c which is rotatably and linearly translatable about an axis rail 512c. In particular, the sample holder 504c is linearly translatable along the axis rail 512c in a direction perpendicular to the track 506c and the laser beam axis 518c. As in the third embodiment, the laser 502c is stationary and the diamond 102 is adjusted relative to the laser 502c depending on whether the laser is in measurement mode or ablation mode.

When the laser apparatus 500c is in measurement mode, the sample holder 504c is perpendicular to the laser beam axis 518c. When switching to ablating mode, however, in addition to rotating about the axis rail 512c at an angle θ as in the third embodiment and linearly translating along the axis rail 512c in a direction perpendicular to the track 506c, the sample holder 504c is also translated along the track 506c. In particular, because the axis rail 512c in this embodiment is not always positioned in the same plane as the laser beam axis 518c, it may be necessary for the sample holder 504c to be linearly adjusted upon rotation, so that the diamond portion intersecting the laser beam axis 518c when the apparatus is in measurement mode (i.e., when the sample holder 504c is perpendicular to the beam 516c) will be the same portion exposed to the laser beam 516c when the apparatus is in ablating mode (i.e., when the sample holder 504c is at an angle of incidence θ relative to the beam 516c).

Figure 6A:
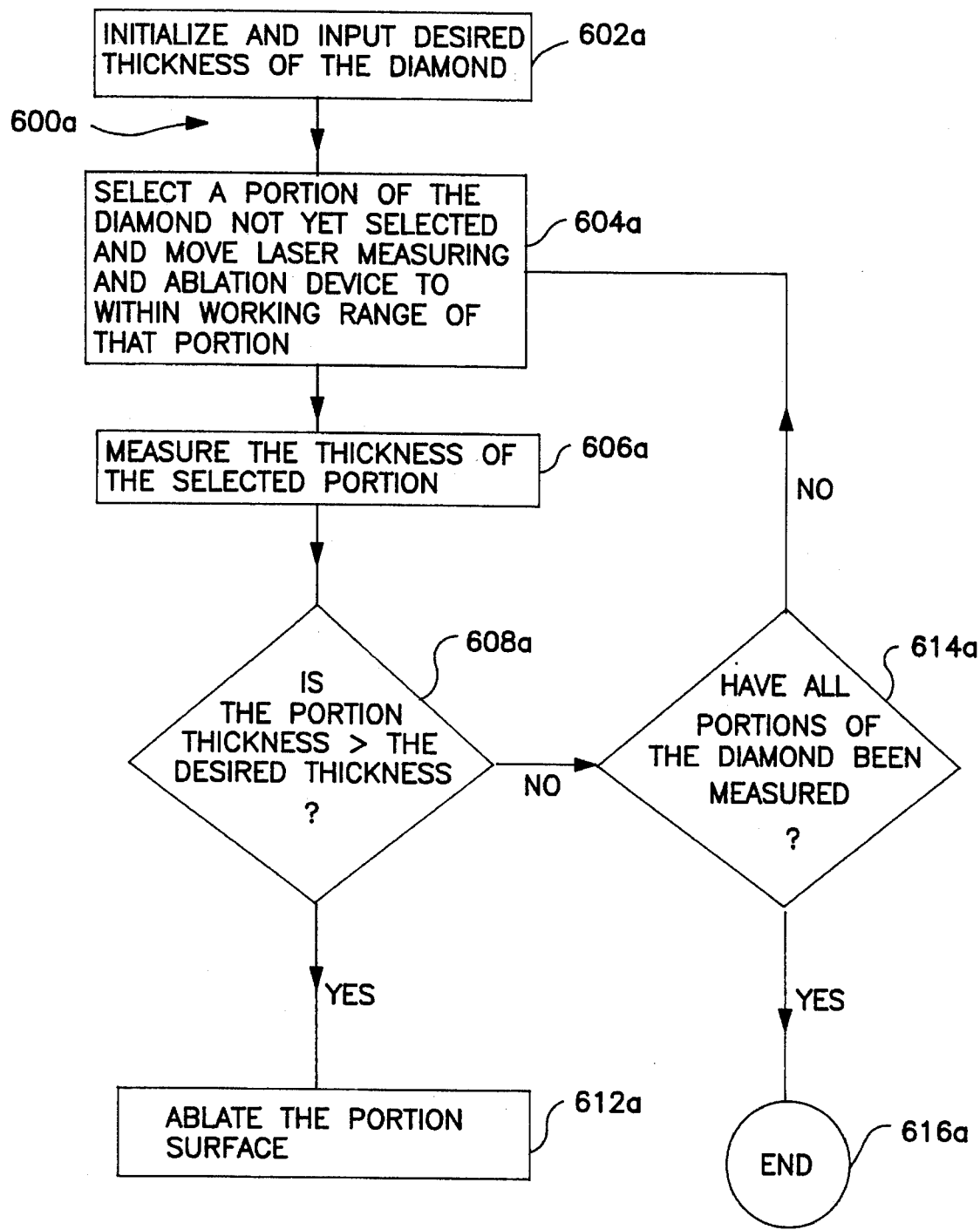
FIG. 6a is a flow-chart of a first method of measuring and ablating a diamond surface.
Figure 6B:
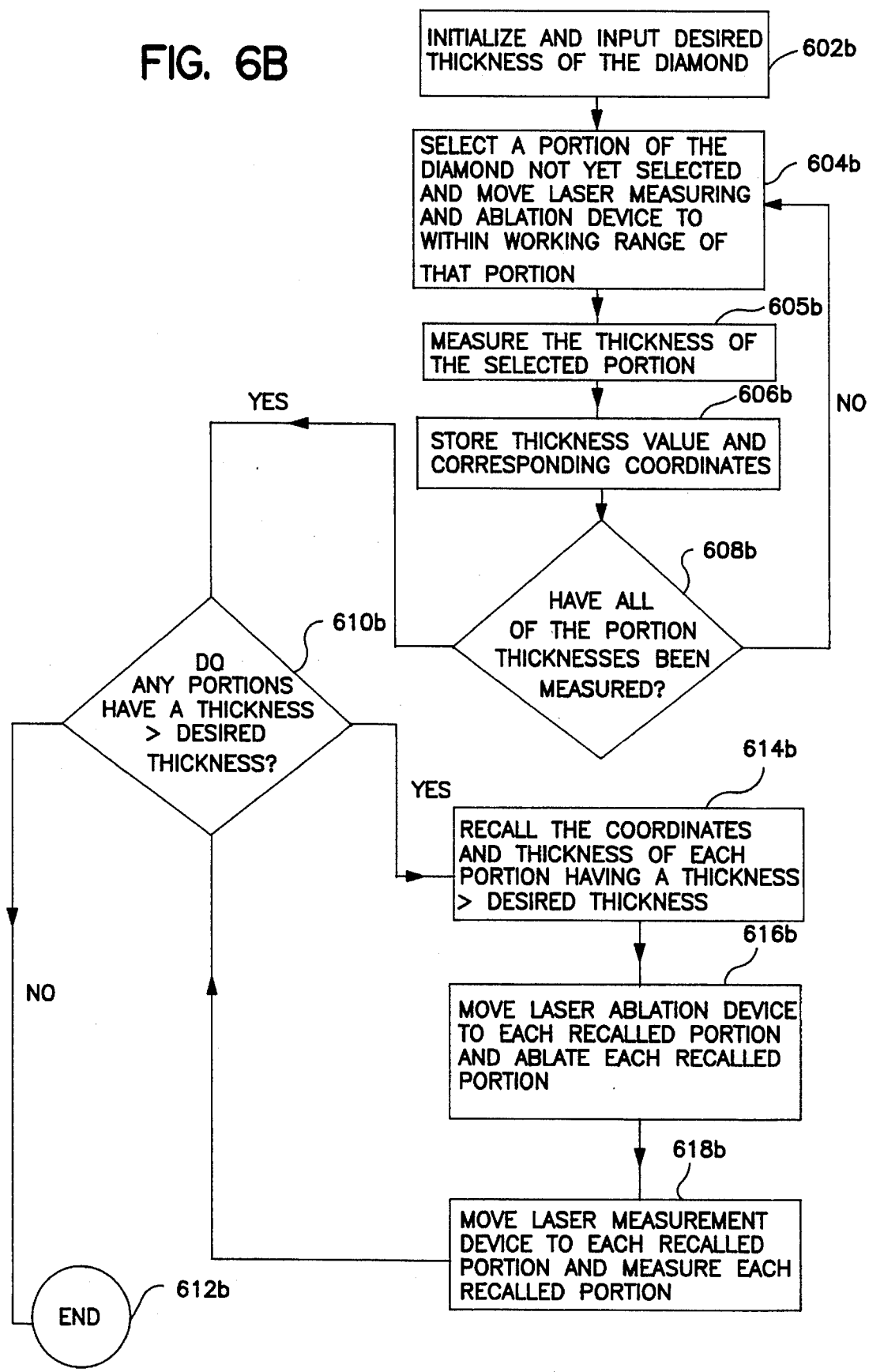
FIG. 6b is a flow-chart of a second method of measuring and ablating a diamond surface.

Turning now to FIGS. 6a and 6b, two flow charts for the laser finishing method of the invention using a laser measuring and ablating device are shown. According to a first method shown in FIG. 6a, measurement and ablation of the diamond surface is carried out substantially concurrently. The diamond surface is first initialized at 602a by relating each portion of the diamond surface to a separate coordinate on a two dimensional cartesian grid representing the diamond surface. The desired thickness of the diamond sample is also input at 602a. The automatic feedback control unit then selects at 604a a portion that has not yet been selected, and moves the measuring and ablation laser device to within working range of that portion. The thickness of the portion is measured at 606a and compared to the desired thickness at 608a by the feedback control unit. If the portion thickness is greater than the desired thickness, the portion is ablated at 612a for a specified time interval and then remeasured at 606a for comparison at 608a to the desired thickness. The specified ablation time interval can be adjusted according to the degree of variation between a measured portion and the desired thickness. If after the portion is remeasured it is determined to still be thicker than the desired thickness, it is once again ablated. The measuring, comparison and ablation of the portion is repeated until the portion thickness is substantially equal to the desired thickness as determined at 608a. At this point, the feedback control unit determines at 614a whether there are any remaining portions that have not been measured. Where there are remaining portions to be measured, the entire process described above is repeated for a new portion selected at 604a until it has a thickness substantially equal to the desired thickness. This is done until all portions have been measured to have the desired thickness, at which point the procedure ends at 616a.

According to the second method of the invention as illustrated in FIG. 6b, every portion of the sample is measured before any ablation. As in the first method, the diamond sample is first initialized at 602b by relating each portion of the sample to a separate coordinate on a two dimensional cartesian grid representing the sample surface. The desired thickness of the diamond sample is also input at 602b. The automatic feedback control unit then selects a portion not yet selected and moves the measuring laser device to within working range of the selected portion at 604b. The automatic feedback control unit then activates the measuring laser device and measures the portion thickness at 605b before storing the measurement at 606b such that it is associated with the grid coordinates of the measured portion. The automatic feedback control unit then determines at 608b whether there are any portions of the sample which have not been measured. If there are, a new portion is measured at 604b, and the measurement is stored at 606b as with the previous portion. The above is repeated until every portion of the sample has been measured. Once measurements for all portions have been taken and stored, the automatic feedback control unit determines at 610b whether any of the stored measurements are greater than the desired thickness. If none of the measurements stored are greater than the desired thickness, the procedure ends at 612b. If any of the portions have a thickness greater than the desired thickness, their grid coordinates and measurements are recalled by the automatic feedback control unit at 614b which then moves the laser ablation device to each portion to be ablated at 616b. The control unit then moves the laser measuring device to each recalled portion and remeasures the thickness of the ablated portions at 618b and determines at 610b whether any portion is still greater than the desired thickness. For those portions found to be greater than the desired thickness, their grid coordinates and measurements are recalled again at 614b, ablated at 616b and remeasured and analyzed at 618b and 610b for desired thickness determination. This process continues until the automatic feedback control unit determines at 610b that no portion is greater than the desired thickness, at which point the process ends at 612b. Depending on the degree of variation between a measured portion and the desired thickness, the feedback control unit may program the power level and duration of the ablation beam for that portion.

There have been described and illustrated herein several embodiments of a programmable diamond surface laser finishing apparatus and method. While particular embodiments of the invention have been described, it is not intended that the invention be limited thereto, as it is intended that the invention be as broad in scope as the art will allow and that the specification be read likewise. Thus, while a dual laser apparatus having adjustable laser and feedback control unit components and a stationary diamond sample is disclosed, a dual laser apparatus with stationary laser and feedback control unit components and an adjustable diamond sample may be constructed. Similarly, while several embodiments of single laser apparatus having either adjustable lasers or positioning means are disclosed, other single laser apparatuses may be constructed. Also while particular laser measurement and ablation methods have been described, any other measuring or ablating method may be used. For example, while a measuring laser is shown to reflect a single beam at a ninety degree angle from the surface, a laser measuring beam parallel to the surface could be also used. Also while an ablating laser beam is shown ablating the surface of a sample at a specific angle, the laser may ablate the surface at a variety of other angles. Furthermore while particular types of positioning means have been disclosed, it will be understood that any suitable positioning means can be used. Also, while particular lasers for measuring and ablating have been disclosed, it will be recognized that other lasers may be similarly used. Moreover, while particular configurations have been disclosed in reference to the energy levels of the lasers and angles of incidence, it will be appreciated that other configurations could be used as well. It will therefore be appreciated by those skilled in the art that yet other modifications could be made to the provided invention without deviating from its spirit and scope as so claimed.

I claim:

1. A laser apparatus for measuring and ablating the surface of a of hard material, said laser apparatus comprising:

a) a measuring laser which measures the surface of the hard material;

b) a feedback control unit coupled to said measuring laser;

c) an ablation laser coupled to said feedback control unit which ablates the surface of the sample of hard material for a time duration and energy level determined by said feedback control unit; and d) electro-mechanical means coupled to said feedback control unit and to one of said laser apparatus and the hard material for positioning one of said laser apparatus and the hard material according to a determination of said feedback control unit.

2. A laser apparatus according to claim 1, wherein:

said measuring laser and said ablation laser are positioned by said electro-mechanical means relative to the hard material.

3. A laser apparatus according to claim 1, wherein:

the hard material is positioned by said electromechanical means.

4. A laser apparatus according to claim 1, wherein:

said measuring laser is a solid state diode laser having a wavelength of substantially 700 nm, and said ablation laser is a frequency doubled YAG or an excimer laser having a wavelength in the range of 190–250 nm and a pulse energy in the range of 50–80 millijoules.

5. A laser apparatus according to claim 4, wherein:

the hard material sample is a diamond sample.

6. A laser apparatus for measuring and ablating the surface of a sample of hard material, said laser apparatus comprising:

a) a laser having a measurement mode for taking measurement values and an ablating mode for ablating the surface of the sample, said laser assuming a first measurement position relative to the sample and a second ablation position different than said first measurement position relative to said sample;

b) a feedback control unit to receive and analyze said measurement values taken by said laser when in said measurement mode, said feedback control unit further controlling energy provided by said laser when in said ablating mode;

c) adjustment means for adjusting one of said laser and the sample such that said laser assumes said first measurement position and said second ablation position relative to said sample, said adjustment means being coupled to and controlled by said feedback control unit;

d) electromechanical means coupled to said feedback control unit and to said adjustment means for positioning one of said laser and the sample relative to the other.

7. A laser apparatus according to claim 6, wherein:

said laser is adjustable by said electro-mechanical means and the sample is stationary.

8. A laser apparatus according to claim 6, wherein:

the sample is adjustable by said electromechanical means and said laser is stationary.

9. A laser apparatus according to claim 6, wherein:

said measuring laser is a solid state diode laser having a wavelength of substantially 700 nm, and said ablation laser is a frequency doubled YAG or an excimer laser having a wavelength in the range of 190–250 nm and a pulse energy in the range of 50–80 millijoules.

10. A laser apparatus according to claim 9, wherein:

the hard material sample is a diamond sample.

11. A method for measuring and ablating the surface of a sample of hard material using a laser apparatus having a laser measurement and ablation means, said method comprising:

a) measuring and recording an indication of a thickness of a first portion of the sample with the laser measurement means;

b) comparing said indication to a value indicating a desired thickness;

c) where said indication indicates that said thickness of said first portion is greater than said desired thickness, without removing the sample from the laser apparatus, ablating said portion for a time interval with the laser ablation means;

d) repeating steps a) through c) until said thickness of said first portion is substantially equal to said desired thickness;

e) where said indication indicates that said thickness is substantially equal to said desired thickness, positioning said laser measurement means to a second portion of the hard material; and f) repeating steps a) through e) until said first portion and said second portion of the sample are substantially equal in thickness.

12. A method according to claim 11, wherein:
said time interval is chosen based on a difference between said thickness and said desired thickness.

13. A method according to claim 11, wherein said laser measurement and ablation means is accomplished by two modes of a single laser, and said method further comprises:
after comparing and before ablating, rotating one of the hard material and the laser ablation means relative to the other such that said laser ablation means generates a laser beam which is angled relative a surface of the hard material.

14. A method according to claim 11, wherein:
the sample of hard material is a diamond.

15. A method for measuring and ablating the surface of a hard material using a laser apparatus having a laser measurement and ablation means, said method comprising:

a) measuring and recording indications of thicknesses of a plurality of portions of the hard material with said laser measurement means;

b) without removing the hard material from the laser apparatus, ablating each of said plurality of portions having a thickness greater than a desired thickness with the laser ablation means for a time interval;

c) remeasuring and rerecording indications of thicknesses of every ablated portion;

d) repeating steps b) through c) until each of said plurality of portions of the hard material has a thickness substantially equal to said desired thickness.

16. A method according to claim 15, wherein:
said time interval is chosen based on a difference between a measured thickness and said desired thickness.

17. A method according to claim 15, wherein said laser measurement and ablation means is accomplished by two modes of a single laser, and said method further comprises:
after measuring and before ablating, rotating one of the hard material and the laser ablation means relative to the other such that said laser ablation means generates a laser beam which is angled relative a surface of the hard material.

18. A method according to claim 15, wherein:
the sample of hard material is a diamond.

* * * * *